United States Patent [19]
Zhou et al.

[11] Patent Number: 5,762,309
[45] Date of Patent: Jun. 9, 1998

[54] RESTRAINING END CLIP FOR VEHICLE SEAT ADJUSTER DRIVE SCREW

[75] Inventors: Peter S. Zhou; Harry Chuck Buchanan, Jr., both of Dayton, Ohio

[73] Assignee: Lear Corporation, Southfield, Mich.

[21] Appl. No.: 664,117

[22] Filed: Jun. 14, 1996

[51] Int. Cl.$^6$ .................. B60N 2/02; B60N 1/00; F16M 13/00
[52] U.S. Cl. .................. 248/429; 297/344.11; 297/330
[58] Field of Search .................. 248/429, 424, 248/602, 638; 297/344.1, 344.11, 330

[56] References Cited

U.S. PATENT DOCUMENTS

| | | | |
|---|---|---|---|
| 4,015,812 | 4/1977 | Heesch . | |
| 4,432,583 | 2/1984 | Russo et al. . | |
| 4,611,778 | 9/1986 | Werner et al. | 248/429 |
| 4,645,159 | 2/1987 | Terada et al. | 248/429 |
| 4,966,045 | 10/1990 | Harney | 297/330 X |
| 5,014,958 | 5/1991 | Harney | 248/429 X |
| 5,048,886 | 9/1991 | Ito et al. . | |
| 5,292,164 | 3/1994 | Bees . | |
| 5,314,158 | 5/1994 | Mouri | 248/429 |
| 5,342,013 | 8/1994 | Ito et al. | 248/429 |
| 5,349,878 | 9/1994 | White et al. | 248/429 X |
| 5,445,354 | 8/1995 | Gauger et al. | 248/429 |
| 5,456,439 | 10/1995 | Gauger | 248/429 |
| 5,467,957 | 11/1995 | Gauger | 248/429 |
| 5,487,520 | 1/1996 | Mouri et al. | 248/429 |
| 5,575,531 | 11/1996 | Gauger et al. | 297/344.11 X |
| 5,613,402 | 3/1997 | Gauger et al. | 248/429 X |

*Primary Examiner*—Randolph A. Reese
*Assistant Examiner*—Robert J. Sandy
*Attorney, Agent, or Firm*—Young & Basile, PC

[57] ABSTRACT

A restraining end clip is mounted on a component of a vehicle power seat adjuster and has a portion coupled to and rotatably supporting the free end of a rotatable drive shaft for minimizing resonance of the free end of the drive screw. The end clip has a first end detachably mountable in an aperture on one of the seat adjuster components. A second end depends from the first end and carries a receiver having an internal recess conformed to the shape of the free end of the drive screw.

20 Claims, 4 Drawing Sheets

RESTRAINING END CLIP FOR VEHICLE SEAT ADJUSTER DRIVE SCREW

BACKGROUND OF THE INVENTION

The present invention relates, in general, to vehicle power seat adjusters.

Power seat adjusters are a popular component in many automotive vehicles. Such power seat adjusters provide powered horizontal fore and aft adjustment of the vehicle seat. It is also known to provide vehicle power seat adjusters with a vertical or elevation drive mechanism to elevate and lower the seat height as a whole. Separate front and rear seat elevation mechanisms have also been provided to independently as well as simultaneously adjust the elevation of the front and rear edges of a vehicle seat. Power seat recliners have also been incorporated into a vehicle power seat adjuster.

Typically, a vehicle power seat adjuster includes an upper support frame or support members which engage and support the seat bottom of a vehicle seat. The upper support members are mounted on first and second, spaced track assemblies, each formed of an upper track which is connected to the upper support members and which is also slidably mounted in a lower track fixedly anchored to the vehicle floor.

A drive mechanism, typically formed of a bi-directional electric motor mounted between the first and second track assemblies, rotates a pair of drive shafts extending outward from the motor to a separate gear assembly or gear box mounted in each upper track. The gear box is connected to a threaded lead screw extending longitudinally along each upper track. A drive block or nut fixedly connected to one of the lower or upper tracks threadingly receives the lead screw to effect reciprocal movement of the upper track and the attached upper support member upon selective direction energization of the drive motor.

A similar drive motor, gear box, and threaded lead screw drives have also been utilized for vertical movement of the front or back, or both ends of the upper support members as well as pivotal movement of the seat back with respect to the seat bottom.

As noted above, and in a typical power seat adjuster drive mechanism, the threaded lead screw is fixedly engaged at a first end by a gear box and is supported at a variable intermediate portion by the drive block or nut. The second opposed end of the lead screw is typically unsupported and overhangs or is cantilevered from the drive block.

However, such drive mechanisms have an inherent noise or squeal problem that occurs during rotation of the drive screw. Such squeal is due to a combination of high contact stress between the drive screw and the drive nut and their runout, as well as the overhung or cantilevered resonating free end of the lead screw. This noise or squeal is objectionable.

Thus, it would be desirable to provide a means for reducing noise or squeal caused by rotation of the drive screw of a vehicle power seat adjuster. It would also be desirable to provide a means for eliminating noise/squeal caused by rotation of a vehicle power seat adjuster drive screw which can be easily added to a vehicle power seat adjuster without extensive modification to the basic power seat adjuster design. It would also be desirable to provide a means for reducing noise/squeal caused by rotation of a vehicle power seat adjuster drive screw which can be easily adapted to most vehicle power seat adjuster lead screw shapes.

SUMMARY OF THE INVENTION

The present invention is a retaining end clip for a vehicle power seat adjuster which dampens or minimizes resonance of the free end of a drive screw in the power seat adjuster.

According to a preferred embodiment of the present invention, a vehicle power seat adjuster includes one component movably supported relative to a second fixed component. A drive screw threadingly engages a drive nut fixedly coupled to one of the components and is carried by the other component such that rotation of the drive screw results in translation of the first component relative to the second component.

In a preferred embodiment, means are coupled to the second end of the drive screw for minimizing resonance of the second end of the drive screw during rotation of the drive screw. Preferably, the resonance minimizing means comprises a restraining end clip having first and second portions. The first portion is adapted to be coupled to one component of a vehicle power seat adjuster. The second portion rotatably supports the second end of the drive screw. Preferably, the second portion includes a receiver shaped to rotatably receive the second end of the drive screw.

Means are carried on the first portion of the restraining end clip for releasably mounting the restraining end clip on the second stationary component of a vehicle seat adjuster. Preferably, clip means are formed on the first portion and adapted to be releasably inserted into an aperture formed in one component of the vehicle seat adjuster.

In an exemplary embodiment, the second portion of the restraining end clip includes a pair of spaced legs extending from the first portion. An end leg is connected to and extends between one end of the pair of legs. The receiver is carried on the end leg. Preferably, the receiver comprises a body having a recess formed therein which closely conforms to the shape of the second end of the drive screw.

In another embodiment in which the retaining end clip is formed of a spring metal, the first and second end portions are formed as a contiguous, one-piece metal member with the second end portion extending substantially perpendicularly from the first end portion. The receiver is formed in the second end portion and includes a recess to rotatably receive the second end of the drive screw.

The restraining end clip of the present invention provides a simple and expedient means for minimizing resonance of the free rotating end of a rotatable drive screw, such as a rotatable drive screw used in a vehicle power seat adjuster. The restraining end clip is of simple, low cost construction and is easily mountable to an existing power seat adjuster without extensive modification to the power seat adjuster design. The restraining end clip may also be configured to couple with any drive screw configuration and orientation. Finally, the restraining end clip of the present invention may be provided in either plastic or metal embodiments to suit the needs of a large number of different applications.

BRIEF DESCRIPTION OF THE DRAWINGS

The various features, advantages and other uses of the present invention will become more apparent by referring to the following detailed description and drawing in which.

3

DESCRIPTION OF THE PREFERRED EMBODIMENT

Referring now to the drawing, and to FIGS. 1-13 in particular, there is depicted a restraining end clip designed to minimize or eliminate the resonance of the free cantilevered end of a rotatable drive screw, such as a drive screw used in a vehicle power seat adjuster.

Figure 1:
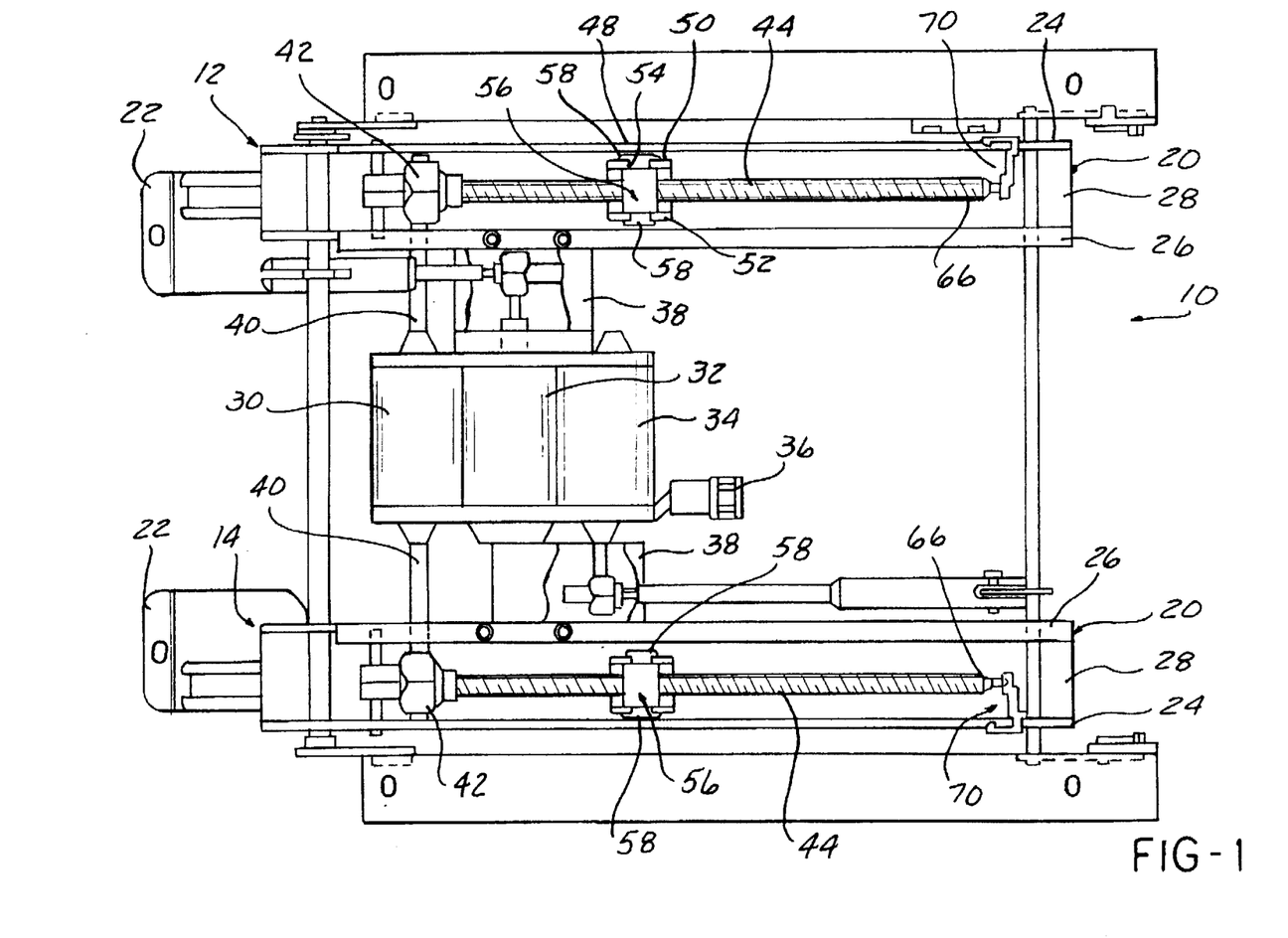
FIG. 1 is a plan, elevational view of an exemplary vehicle power seat adjuster utilizing the restraining end clip of the present invention.

As shown in FIG. 1, there is depicted a power seat adjuster 10 which variably positions an automotive vehicle seat in any user selected position. The power seat adjuster 10 is a so-called "six-way" adjuster which provides horizontal fore and aft, and vertical up and down movement of separate front and rear ends of the seat. It will be understood, however, that the power seat adjuster described hereafter can be constructed with only horizontal fore and aft movement, as well as with or without any number of other movements, such as pivotal tilting of the seat back with respect to the seat bottom of a vehicle seat.

As shown in FIG. 1, the power seat adjuster 10 includes two track assemblies 12 and 14 which are disposed in a spaced apart manner and anchored to the floor of a vehicle, as described hereafter. As the track assemblies 12 and 14 are identically constructed as mirror images of each other, the following description will be provided only for track assembly 12. It will be understood that track assembly 14 is similarly constructed.

The track assembly 12 includes a lower track, not shown, and an upper track 20 which is slidably movable thereover. As is conventional, the lower track is formed with an upper portion slidably engaged with the upper track 20. A leg depends from the upper portion of the lower track and has a first or front end and a second or rear end. A front riser 22 is connected by means of suitable fasteners, such as rivets, to the first end of the leg of the lower track. Similarly, a rear riser, not shown, is connected to the second or rear end of the leg by means of rivets. The front and rear risers are anchored by means of suitable fasteners or anchors to the vehicle floor in a conventional manner to stationarily mount the lower track to the vehicle floor.

4

The upper track 20 includes a pair of opposed side walls 24 and 26. A central base 28 is integrally formed with and extends between lower ends of the side walls 24 and 26. Lower webs, not shown, extend below the base 28 and inward from the juncture of the side walls 24 and 26 and the base 28 and terminate in a pair of spaced flanges 52 and 54 which form a channel therebetween which receives the upper portion of the lower track.

Both the lower track and the upper track 20 are formed, for example, of an extruded, lightweight, high strength material, such as aluminum or aluminum alloy.

The power seat adjuster 10 includes a first, horizontal drive means which is preferably in the form of a bi-directional electric drive motor 30. Also provided on the power seat adjuster 10 are a first or front vertical drive means or motor 32 and a second or rear vertical drive means or motor 34. An electrical connector 36 is provided for providing power and control signals to the motors 30, 32 and 34. The motors 30, 32 and 34 are arranged, by example, side-by-side and interconnected by end caps. The end caps are in turn securely connected to the opposed track assemblies 12 and 14 by means of mounting brackets 38. Further details concerning the construction and operation of the drive motors 32 and 34 in controlling elevation of the seat may be had by referring to U.S. Pat. No. 5,292,164, the contents of which are incorporated herein by reference in its entirety.

The first or horizontal drive motor 30 has two drive shafts 40 extending outward from opposite ends to the track assemblies 12 and 14. Each drive shaft 40, which may be a rigid, tubular member or a flexible cable, rotatably passes through an aperture formed in one end of each of the upper tracks 20. The drive shaft 40 provided with the track assembly 12 is connected to a horizontal drive transmission means or gear box 42. The gear box 42 is securely connected to the upper track 20 of the track assembly 12 by means of a roll pin which extends between the side walls 24 and 26 of the upper track 20.

The horizontal drive transmission means or gear box 80 is of conventional construction and, by way of example only, includes a worm and worm gear disposed within an outer housing. The worm receives one end of the horizontal drive shaft 40 from the motor 30 and threadingly engages the worm gear which is formed about or mounted on one end of a horizontal drive lead screw 44. In this manner, the horizontal drive transmission means 42 serves to translate the rotation of the output shaft 40 of the horizontal drive motor 30 to rotation of the horizontal drive screw 44 which is oriented 90° with respect to the output shaft 40 of the drive motor 30. It will be understood that a similar drive transmission means 42 is also mounted in the opposed track assembly 14 and interconnected to the opposite output shaft 40 of the drive motor 30 and a second horizontal drive screw 44.

A lower track coupler in the form of a horizontal drive block bracket 48 is mounted in the upper track 20. The drive block bracket 48 is formed with first and second side walls 50 and 52. An open ended slot 54 is formed in each side wall 50 and 52 and divides each of the side walls 50 and 52 into two separate portions. The side walls 50 and 52 are integrally connected by a central base and form an open ended channel extending through the drive block bracket 48.

A horizontal drive block or nut 56, which also forms a part of the lower track coupler, has a generally cylindrical housing with a pair of outwardly extending flanges 58 extending from opposite sides thereof. The flanges 58 terminate in enlarged end heads. The flanges 58 seat within the slots 54 in the drive nut mounting bracket 56 with the end heads being disposed exteriorly of the slots 54 and are spaced from the outer surfaces of the side walls 50 and 52 of the drive block mounting bracket 48 to mount the drive nut 56 in the drive block mounting bracket 48. A threaded internal bore is formed in the drive nut block 56 and threadingly receives the horizontal lead screw 44 therethrough in a threading, meshing engagement.

In operation, the drive block mounting bracket 48 due to its fixed, stationary connection to the lower track, stationarily supports the drive nut 56 about the horizontal lead screw 44. Energization of the horizontal drive motor 30 for rotation of the output shaft 40 in one direction will cause the drive transmission means or gear box 42 to rotate the drive screw 44 in one direction. Since the drive nut 56 is stationarily positioned and fixed to the lower track 14, rotation of the horizontal drive screws 44 in both of the track assemblies 12 and 14 will cause the upper tracks 20 of each of the track assemblies 12 and 14 to move horizontally in one direction depending upon the direction of rotation of the output shaft 42 of the horizontal drive motor 30. This enables the horizontal position of the upper tracks 20 of the track assemblies 12 and 14 to be adjusted by the user to any selectible horizontal fore or aft position. A reversal of the control signals to the horizontal drive motor 30 by way of a user activated switch will cause rotation of the output shaft 40 of the drive motor 30 in an opposite direction which will correspondingly result in rotation of the horizontal drive screws 44 in an opposite direction to cause movement of the upper tracks 20 of the track assemblies 12 and 14 in an opposite horizontal direction.

As is also shown in FIG. 1, the free or second end 66 of each horizontal drive screw 44, opposite from the gear box or transmission 48, is illustrated as being coupled to a restraining end clip 70 which is fixedly mounted to the side wall 24 of the upper track 20.

Figure 2:
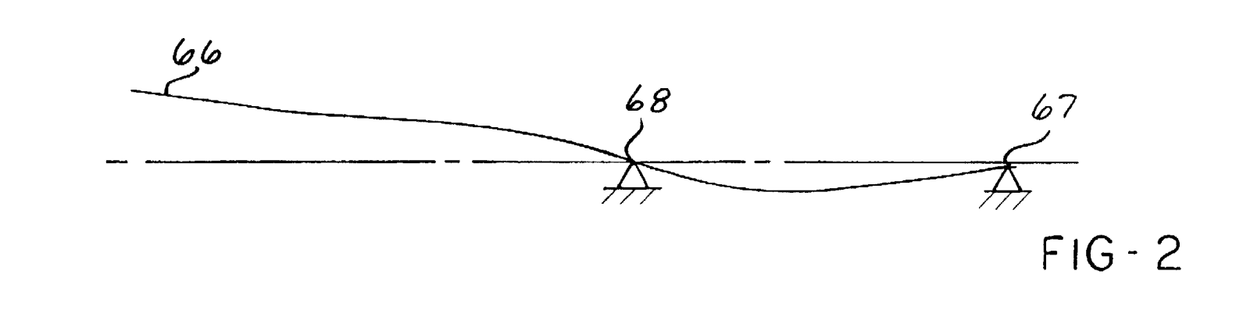
FIG. 2 is a graphic representation of a vehicle power seat adjuster drive screw end resonance mode shape.

Digressing briefly, FIG. 2 depicts the resonance mode shape of the second or free end 66 of the screw 44. Reference number 67 depicts the fixed connection of the first end of the drive screw 44 to the gear box or transmission 42. Reference number 68 depicts the connection of the drive screw 44 to the drive nut 56. As shown in FIG. 2, during rotation of the drive screw 44, the cantilevered or free end 66 exhibits a high amplitude resonance. This resonance results in an objectionable noise or squeal.

Figures 3, 6, 7:
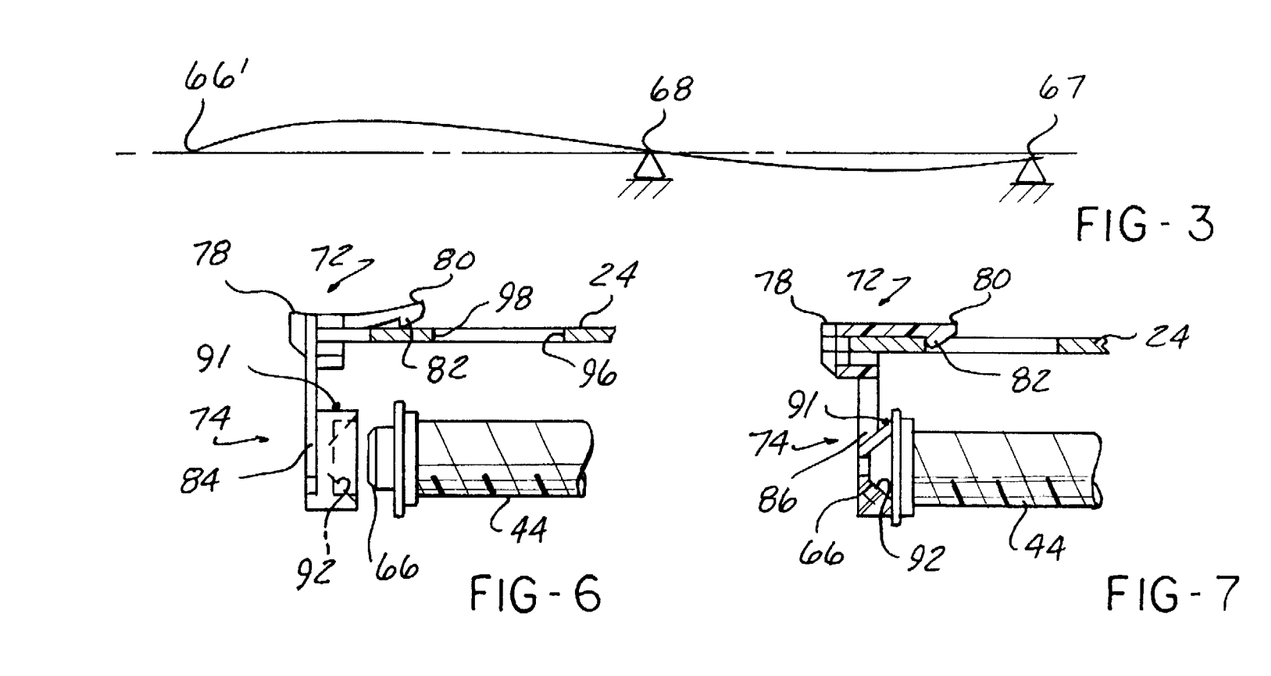
FIG. 3 is a graphic representation of the resonance mode shape of the drive screw of a vehicle power seat adjuster incorporating the restraining end clip of their present invention.
FIG. 6 is an exploded, partially cross-section, plan view showing the assembly of the restraining end clip of the present invention on a vehicle power seat adjuster.
FIG. 7 is a partially cross-sectioned, view of the end clip, vehicle power seat adjuster, and drive screw shown in their assembled position.

It is the intent of the present invention to provide a means for minimizing the resonance of the free second 66 of the drive screw 44 so as to reduce or minimize objectionable noise or squeal caused by such resonance. The ideal resonance mode shape is shown in FIG. 3 wherein the magnitude of the resonance or vibration at the second end 66' of the drive screw 44 has been reduced to substantially zero.

Referring now to FIGS. 4-8, there is depicted a first embodiment of a restraining end clip 70. In this embodiment, the restraining end clip 70, hereafter referred to simply as the "end clip 70" is formed of an elastomer or a suitable plastic material, such as a molded acetal plastic.

As shown in FIGS. 4-8, the end clip 70 is preferably in the form of a unitary, one-piece, integral body having a first or top end portion 72 and a second depending portion 74. The first end portion 72 is preferably in the form of a planar wall 76 which extends from a first end 78 to a second end 80. A hook or notch 82 is formed at the second end 80 of the wall 76, the purpose of which will be described hereafter.

Figure 4:
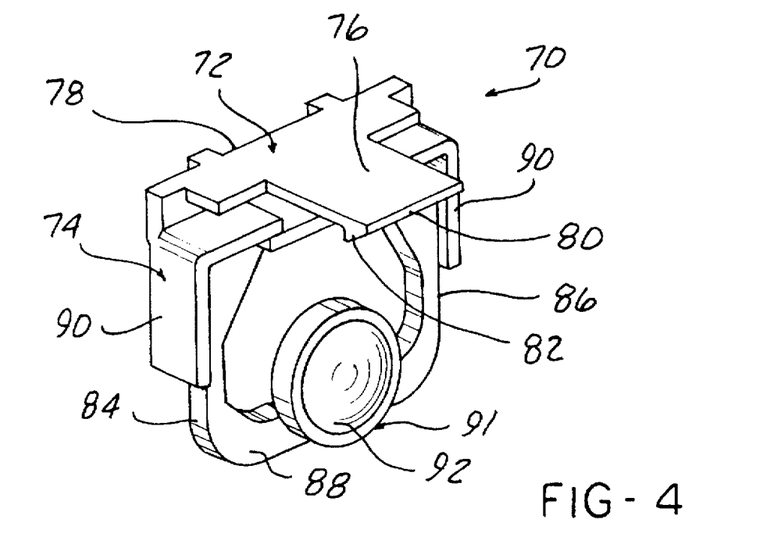
FIG. 4 is a perspective view of one embodiment of a restraining end clip constructed in accordance with the teachings of the present invention.
Figure 5:
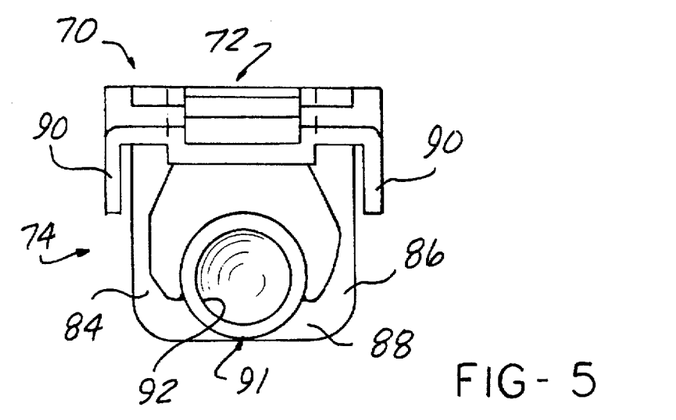
FIG. 5 is a front elevational view of the restraining end clip shown in FIG. 4.

Second portion 74 depends from the first portion 72 and includes a pair of depending legs 84 and 86. A base or end leg 88 is connected to one of the depending legs 84 and 86 and extends therebetween.

In this embodiment, a pair of outer flanges 90 are formed as part of the second portion 74 and depend from the first portion 72; but are spaced laterally outward from the respective depending legs 84 and 86 as shown in FIG. 5.

A receiver means denoted generally by reference number 91 is carried on the end leg 88. The receiver means 91 preferably comprises a solid body integrally carried with the end leg 88 and having a concave recess 92 formed therein. The recess 92 has a shape complementary to the end shape of the second end 66 of the drive screw 44 so as to rotatably support the second end 66 of the drive screw 44. A suitable layer of lubricant may be precoated on the interior surface of the recess 92. Alternately, the inner surface of the recess 92 or the entire receiver 91 may be impregnated with a suitable lubricant.

Figure 8:
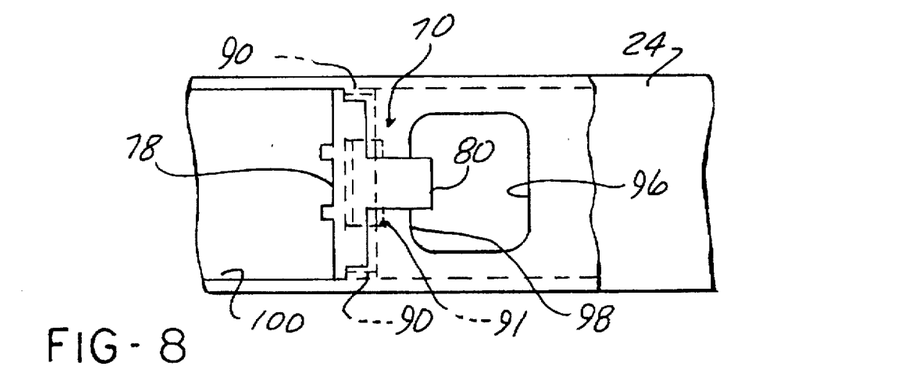
FIG. 8 is a side elevational view showing the mounting of the restraining end clip depicted in FIGS. 4 and 5 on a vehicle power seat adjuster.

As shown in FIGS. 6-8, a first aperture 96 is formed in the side wall 24 of the upper track 20. An edge 98 of the upper wall 24 is surrounding one portion of the aperture 96 is engaged by the notch 82 on the first end portion 72 of the end clip 70. A second aperture 100 is also formed in the side wall 24 of the upper track for slidably receiving the end clip 70 therein.

As shown in FIGS. 6-8, the end clip 70 is inserted through the aperture 100 until the notch 82 slides over and engages the edge 98 of the side wall 24 at one end of the aperture 96 to detachably mount the end clip 70 on the upper track. In this mounting position, the recess 92 in the receiver 91 rotatably engages the free or second end 66 of the drive screw 44 to rotatably support the second end 66 of the drive screw 44. However, since the end clip 70 is dimensionally fixed with respect to the side wall 24 of the upper track 20, the end clip 70 functions to minimize or eliminate the high amplitude resonance of the second end 66 of the drive screw 44 thereby significantly minimizing or substantially reducing the objectionable noise and squeal associated with previously devised cantilevered ends of rotatable drive screws.

Figure 9:
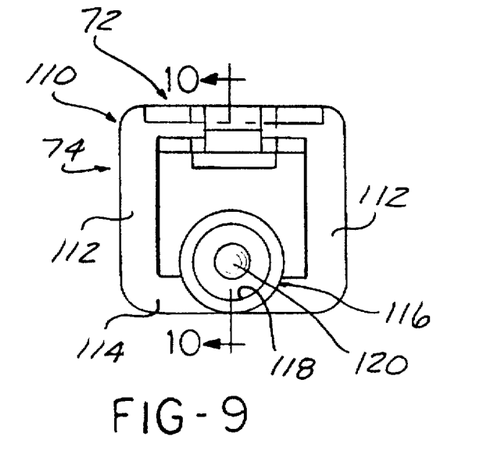
FIG. 9 is a front elevational view of an alternate embodiment of the restraining end clip of the present invention.
Figure 10:
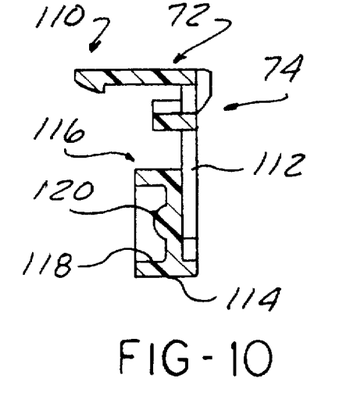
FIG. 10 is a cross-sectional view generally taken along line 10—10 in FIG. 9.

Referring now to FIGS. 9 and 10, there is depicted another embodiment of the restraining end clip 110 of the present invention. The end clip 110 is similar to the end clip 70 in that it is made of a unitary, one-piece, plastic or elastomer body. Further, the end clip 110 also includes a first end portion 72 and a second end portion 74. The second portion 74 is formed of a pair of spaced depending legs 112 which are joined at one end by an end leg 114. A receiver means 116 is integrally carried on the end leg 114. The receiver 116 has a generally concave recess 118 formed therein which is configured complementary to the shape of an associated end of the drive screw 44. A raised dimple 120 may be formed centrally in the recess 118 for engagement with a corresponding, complementary recess in the end of the drive screw 44 to center the drive screw in the recess 118.

The second embodiment of the restraining end clip 110 shown in FIGS. 9 and 10 functions in the same manner as the end clip 70 described above in that it minimizes or reduces the amplitude of the resonance of the free or second end 66 of the drive screw 44.

Figure 11:
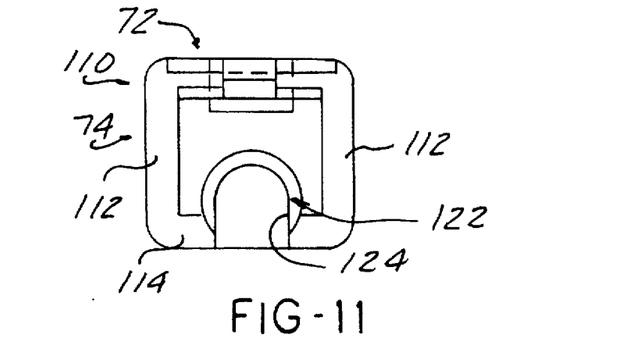
FIG. 11 is a front elevational view of another embodiment of a restraining end clip.

FIG. 11 depicts an alternate embodiment to the end clip 110 described above and shown in FIGS. 9 and 10. In this embodiment, a receiver 122 is fixedly carried on the end wall 114. An open ended slot 124 is formed in the receiver 122 and extends from a lower edge contiguous with the lower edge of the end wall 114. The interior shape of the slot or recess 124 conforms to the shape of the free end 66 of the drive screw 44.

Figure 12:
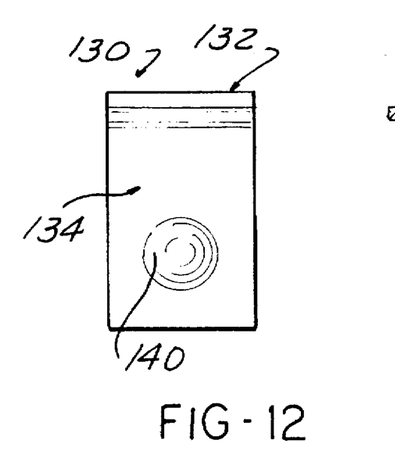
FIG. 12 is a front elevational view of yet another embodiment of the restraining end clip according to the present invention.
Figure 13:
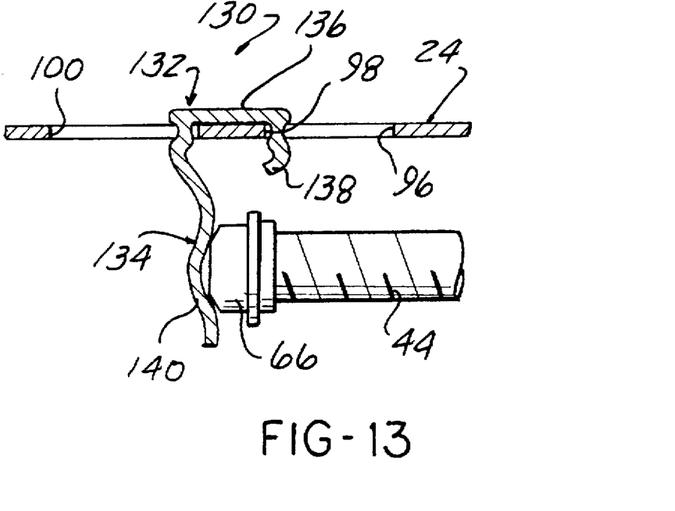
FIG. 13 is a partially cross-sectional, assembled view showing the restraining end clip of FIG. 12 mounted on a vehicle power seat adjuster.

FIGS. 12 and 13 depict yet another embodiment of a restraining end clip of the present invention. In this embodiment, the restraining end clip 130 is a unitary, one-piece member constructed of a suitable spring metal, such as spring steel. The end clip 130 is formed of a contiguous first end portion 132 and a depending second end portion 134. First end portion 132 is in the form of a generally planar wall 136 which terminates in a clip-shaped, depending end 138. The clip-shaped end 138 is designed to snap over the edge 98 of the aperture 96 in the side wall 24 of the upper track 20 to fixedly yet releasibly mount the restraining end clip 130 to the side wall 24.

The second end portion 134 of the end clip 130 extends through the aperture 100 formed in the side wall 120. A receiver means 140 is integrally formed in the second end portion 134 and has a generally concave shape to rotatably receive and support the second end 66 of the drive screw 44. The receiver means 140 can simply be a concave recess formed centrally in a lower end portion of the second portion 134, as shown in FIGS. 12 and 13.

The end clip 130 functions in the same manner as the previously described end clips to dampen or minimize the amplitude of resonance of the second end 66 of the drive screw 44 to minimize or substantially eliminate any objectionable noise or squeal emanating therefrom.

In summary, there has been disclosed a unique restraining end clip which reduces or minimizes the resonance of the free or cantilevered end of a horizontal drive screw used in a vehicle power seat adjuster. The restraining end clip is of simple construction for a low manufacturing cost. Further, the end clip may be easily mounted on a vehicle power seat adjuster without extensive modification to the seat adjuster itself. The end clip may also be configured to conform to the shape of most drive screw configurations used in vehicle power seat adjusters.

What is claimed is:

1. A vehicle power seat adjuster having a first component mounted for movement relative to a second component adapted to be fixedly mounted in a vehicle, the power seat adjuster comprising:

a drive screw having first and second ends;

means, coupled to the first end of the drive screw, for rotating the drive screw;

a drive nut carried on one of the first and second components and engagable with the drive screw to effect movement of the first component relative to the second component upon rotation of the drive screw; and means, carried on one of the first and second components and coupled to the second end of the drive screw, for minimizing resonance of the drive screw during rotation of the drive screw, the resonance minimizing means coupled to one of the first and second components of the vehicle power seat adjuster and including a receiver shaped to rotatable receive the second end of the drive screw.

2. The apparatus of claim 1 wherein the resonance minimizing means comprises:

an end clip having first and second portions;

the first portion coupled to one of the first and second components of the vehicle power seat adjuster; and the second portion rotatably supporting the second end of the drive screw.

3. A vehicle power seat adjuster having a first component mounted for movement relative to a second component adapted to be fixedly mounted in a vehicle, the power seat adjuster comprising:

a drive screw having first and second ends;

means, coupled to the first end of the drive screw, for rotating the drive screw;

a drive nut carried on one of the first and second components and engagable with the drive screw to effect movement of the first component relative to the second component upon rotation of the drive screw; and means, carried on one of the first and second components and coupled to the second end of the drive screw, for minimizing resonance of the drive screw during rotation of the drive screw, the resonance minimizing means including:

an end clip having first and second portions;

the first portion coupled to one of the first and second components of the vehicle power seat adjuster;

the second portion rotatable supporting the second end of the drive screw; and means, carried on the first portion, for releasably mounting the first portion to one of the first and second components of the seat adjuster.

4. The apparatus of claim 3 wherein the mounting means comprises:

clip means carried on the first portion adapted for releasable insertion into an aperture formed in one of the first and second components of the vehicle power seat adjuster.

5. A vehicle power seat adjuster having a first component mounted for movement relative to a second component adapted to be fixedly mounted in a vehicle, the power seat adjuster comprising:

a drive screw having first and second ends;

means, coupled to the first end of the drive screw, for rotating the drive screw;

a drive nut carried on one of the first and second components and engagable with the drive screw to effect movement of the first component relative to the second component upon rotation of the drive screw; and means, carried on one of the first and second components and coupled to the second end of the drive screw, for minimizing resonance of the drive screw during rotation of the drive scew, the resonance minimizing means including:

an end clip having first and second portions;

the first portion coupled to one of the first and second components of the vehicle power seat adjuster; and the second portion including a receiver shaped to rotatably receive and support the second end of the drive screw.

6. The apparatus of claim 5 wherein the second portion comprises:

a pair of spaced legs extending from the first portion; and an end leg connected to and extended between the pair of legs, the receiver mounted on the end leg.

7. The apparatus of claim 5 wherein the receiver comprises:

a body; and a recess formed in the body and closely conforming to the shape of the second end of the drive screw.

8. The apparatus of claim 2 wherein the end clip is formed of plastic.

9. The apparatus of claim 2 wherein the end clip is formed of a spring metal.

10. The apparatus of claim 2 wherein:

the end clip wherein the first and second portions of the end clip are formed as a one-piece, unitary member.

11. A vehicle power seat adjuster having a first component mounted for movement relative to a second component adapted to be fixedly mounted in a vehicle, the power seat adjuster comprising:

a drive screw having first and second ends;

means, coupled to the first end of the drive screw, for rotating the drive screw;

the second end of drive screw being normally freely mounted;

a drive nut carried on one of the first and second components and engagable with the drive screw to effect movement of the first component relative to the second component upon rotation of the drive screw; and means, carried on one of the first and second components and coupled to the second end of the drive screw, for minimizing resonance of the drive screw during rotation of the drive screw, the resonance minimizing means comprising:

an end clip having first and second portions;

the first portion including clip means adapted for insertion into an aperture in one of the first and second components of the vehicle power seat adjuster and for detachably mounting the first portion to one of the first and second components;

the second portion including a pair of spaced legs depending from the first portion and an end leg connected to and extending between the pair of legs; and receiver means, carried on the end leg, for rotatably receiving the second end of the drive screw.

12. A vehicle power seat adjuster having a first component mounted for movement relative to a second component adapted to be fixedly mounted in a vehicle, the power seat adjuster comprising:

a drive screw having first and second ends;

means, coupled to the first end of the drive screw, for rotating the drive screw;

a drive nut carried on one of the first and second components and engagable with the drive screw to effect movement of the first component relative to the second component upon rotation of the drive screw; and means, carried on one of the first and second components and coupled to the second end of the drive screw, for minimizing resonance of the drive screw during rotation of the drive screw, the resonance minimizing means coupled to one of the first and second components of the vehicle power seat adjuster, the resonance minimizing means including:

an end clip having first and second portions;

the first portion coupled to one of the first and second components of the vehicle power seat adjuster; and the second portion cantilevered from the first portion and rotatably supporting the second end of the drive screw.

13. The vehicle power seat adjuster of claim 12 wherein:

the second position resiliently suppports the second end of the drive screw.

14. In a vehicle power seat adjuster having a pair of spaced track assemblies each formed of first and second tracks, a drive motor coupled to a first end of and rotating a drive screw rotatable mounted in each of the first and second track assemblies and a drive nut fixedly mounted to one of the first and second tracks of each of the first and second track assemblies and threadingly receiving the drive screw to effect movement of the first track relative to the second track upon rotation of the drive screw, a second end of the drive screw being cantilevered from the drive nut, the improvement comprising:

restraining means, mounted on one of the first and second tracks of each of the first and second track assemblies, and rotatable coupled to the second end of the drive screw, for minimizing resonance of the second end of the drive screw during rotation of the drive screw, the restraining means including:

an end clip having first and second portions;

the first portion coupled to one of the first and second components of the vehicle power seat adjuster;

the second portion rotatable supporting the second end of the drive screw; and means, carried on the first end portion, for releasably mounting the first end portion to one of the first and second components of the seat adjuster.

15. The improvement of claim 14 wherein the mounting means comprises:

clip means carried on the first portion adapted for releasable insertion into an aperture formed in one of the first and second components of the vehicle power seat adjuster.

16. In a vehicle power seat adjuster having a pair of spaced track assemblies each formed of first and second tracks, a drive motor coupled to a first end of and rotating a drive screw rotatable mounted in each of the first and second track assemblies and a drive nut fixedly mounted to one of the first and second tracks of each of the first and second track assemblies and threadingly receiving the drive screw to effect movement of the first track relative to the second track upon rotation of the drive screw, a second end of the drive screw being cantilevered from the drive nut, the improvement comprising:

restraining means, mounted on one of the first and second tracks of each of the first and second track assemblies, and rotatable coupled to the second end of the drive screw, for minimizing resonance of the second end of the drive screw during rotation of the drive screw, the restraining means including:

an end clip having first and second portions;

the first portion coupled to one of the first and second components of the vehicle power seat adjuster; and the second portion including a receiver shaped to rotatably receive and support the second end of the drive screw.

the second position resiliently supports the second end of the drive screw.

17. The improvement of claim 16 wherein the second portion comprises:

a pair of spaced legs extending from the first portion; and an end leg connected to and extended between the pair of legs, the receiver mounted on the end leg.

18. The improvement of claim 16 wherein the receiver comprises:

a body; and a recess formed in the body and closely conforming to the shape of the second end of the drive screw.

19. The improvement of claim 16 wherein the end clip is formed of plastic.

20. The improvement of claim 16 wherein the end clip is formed of a spring metal.

* * * * *

UNITED STATES PATENT AND TRADEMARK OFFICE
CERTIFICATE OF CORRECTION

PATENT NO. : 5,762,309
DATED : June 9, 1998
INVENTOR(S) : Zhou et al.

It is certified that error appears in the above-indentified patent and that said Letters Patent is hereby corrected as shown below:

Column 9, line 58, delete "position" and insert --portion--.

Column 10, lines 49 and 50, delete in their entirety.

Signed and Sealed this

First Day of September, 1998

Attest:

BRUCE LEHMAN

Attesting Officer     Commissioner of Patents and Trademarks